(12) United States Patent
Choi et al.

(10) Patent No.: US 11,029,169 B2
(45) Date of Patent: Jun. 8, 2021

(54) NAVIGATION SERVICE METHOD FOR PROVIDING UNUSABLE ROUTE INFORMATION RELATED TO EMERGENCY AREA AND SERVER APPARATUS FOR THE SAME

(71) Applicant: Electronics and Telecommunications Research Institute, Daejeon (KR)

(72) Inventors: Jae-Hyuk Choi, Daejeon (KR); Young-Su Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 239 days.

(21) Appl. No.: 16/175,597

(22) Filed: Oct. 30, 2018

(65) Prior Publication Data

US 2019/0128688 A1    May 2, 2019

(30) Foreign Application Priority Data

Oct. 31, 2017  (KR) .................. 10-2017-0144135
Oct. 1, 2018   (KR) .................. 10-2018-0116895

(51) Int. Cl.
  *G01C 21/34*  (2006.01)
  *H04W 4/024* (2018.01)
  *H04W 4/90*  (2018.01)

(52) U.S. Cl.
  CPC ..... *G01C 21/3492* (2013.01); *G01C 21/3407* (2013.01); *G01C 21/3461* (2013.01); *H04W 4/024* (2018.02); *H04W 4/90* (2018.02)

(58) Field of Classification Search
  CPC .... H04W 4/024; H04W 4/90; G01C 21/3407; G01C 21/3461
  See application file for complete search history.

(56) References Cited

U.S. PATENT DOCUMENTS 9,460,603 B2  10/2016 Hamano et al.
2008/0261627 A1*  10/2008 Manson .................. G06F 16/29
                                                             455/457
(Continued)

FOREIGN PATENT DOCUMENTS

JP     2007172240 A    7/2007
JP       5739467 B2    6/2015
(Continued)

OTHER PUBLICATIONS

"Navigation Service Framework", OMA-ER-NavSe-V1.0, Open Mobile Alliance, Mar. 14, 2018.
(Continued)

*Primary Examiner* — Michael D Lang
(74) *Attorney, Agent, or Firm* — William Park & Associates Ltd.

(57) ABSTRACT

Disclosed herein are a navigation service method for providing unusable route information related to an emergency area and a server apparatus therefor.
The navigation service method includes constructing an emergency area resource including unusable route information related to an emergency area; and receiving trip parameters from multiple applications and transmitting a link, through which the emergency area resource is accessible, to an application, the trip parameter of which includes a request to provide unusable route information related to an emergency area, wherein transmitting the link is configured to transmit a link, through which the same emergency area resource is accessible, to applications that request provision of unusable route information related to the same emergency area.

16 Claims, 8 Drawing Sheets

(56) References Cited

U.S. PATENT DOCUMENTS

2012/0150444 A1   6/2012  Hong et al.
2013/0211718 A1   8/2013  Yoo et al.
2016/0061625 A1   3/2016  Wang
2016/0371966 A1*  12/2016 P ........................ G01C 21/3415

FOREIGN PATENT DOCUMENTS

KR         101339017 B1   12/2013
KR       1020150091824 A   8/2015

OTHER PUBLICATIONS

"RESTful Network API for Navigation Service Framework", OMA-TS-REST_NetAPI_NavSe-V1.0, Open Mobile Alliance, Mar. 14, 2018.

* cited by examiner

NAVIGATION SERVICE METHOD FOR PROVIDING UNUSABLE ROUTE INFORMATION RELATED TO EMERGENCY AREA AND SERVER APPARATUS FOR THE SAME

CROSS REFERENCE TO RELATED APPLICATIONS

This application claims the benefit of Korean Patent Application No. 10-2017-0144135, filed Oct. 31, 2017, and No. 10-2018-0116895, filed Oct. 1, 2018, which are hereby incorporated by reference in their entirety into this application.

BACKGROUND OF THE INVENTION

1. Technical Field

The following embodiment relates to a navigation service method for providing information about unusable routes in an emergency area and a server apparatus to which the navigation service method is applied.

2. Description of the Related Art

The statements in this section merely provide background information related to the following embodiment and do not necessarily constitute the conventional art.

In the conventional method, a navigation terminal internally calculates a route by detecting the current position thereof, that is, the origin of a trip, through connection with a Global Positioning System (GPS) and by receiving the destination of the trip from a user. However, with the spread of smartphones and the improvement in the performance of smartphones, a service method in which a traffic and route information provision server provides route information, real-time traffic information related to corresponding routes, and various kinds of information to Personal Navigation Devices (PNDs) over a mobile communication network is currently being used.

Particularly, although various navigation services are available, the Open Mobile Alliance (OMA) standardization organization is trying to generalize a navigation service for delivering real-time traffic information using a Peer-to-Peer (P2P) communication method through an Internet Protocol (IP)-based network of a mobile communication network or a wireless network, rather than using the method of transmitting Traffic Protocol Expert Group (TPEG) information over a Digital Multimedia Broadcasting (DMB) network, in which information is provided through broadcasting. In order to provide such a service, the OMA Location Working Group (OMA LOC WG) is working on standardization of a Navigation Service Framework (NavSe).

For a navigation service based on mobile communication, the NavSe standard defines a framework for providing users with functions for an emergency navigation service, along with route and traffic information for vehicle navigation systems and route information for indoor navigation systems. In the NavSe standard, route and traffic information for vehicle navigation systems is configured using a TPEG standard defined by ISO, which is widely used in the market, and route information for indoor navigation systems is configured using an IndoorGML standard defined by OGC. IndoorGML is a standard for modeling indoor spaces for the purpose of navigation. The NavSe standard provides standardized route and traffic information such that users can be provided with indoor and outdoor navigation services through ISO TPEG and OGC IndoorGML standards.

SUMMARY OF THE INVENTION

Embodiments of the present invention are intended to provide a navigation service method and a server apparatus in which, when a server provides information about unusable routes in an emergency area in a navigation service based on mobile communication, a navigation device, which is capable of autonomously calculating a route, may efficiently calculate a route by excluding unusable routes, and in which, when information about other unusable routes is collected, updated information may be easily provided.

According to an aspect of the embodiment, there is provided a method in which a server provides route information related to an emergency area to a terminal that is capable of calculating a route, the method including constructing an emergency area resource that includes unusable route information related to an emergency area; and receiving trip parameters from multiple applications and transmitting a link, through which the emergency area resource is accessible, to an application, the trip parameter of which includes a request to provide unusable route information related to an emergency area, wherein transmitting the link is configured to transmit a link, through which the same emergency area resource is accessible, to applications that request provision of unusable route information related to the same emergency area.

An embodiment of the method may include one or more of the following characteristics.

Constructing the emergency area resource may be configured to construct the emergency area resource so as to include information about a route that is unusable in the emergency area at present and information about a route expected to be unusable in the future.

The method may further include receiving a request to subscribe to a notification service related to the emergency area from an application; and notifying the application, which requests subscription to the notification service, of updated unusable route information when the unusable route information is updated.

Constructing the emergency area resource may be configured to construct the emergency area resource so as to include information about a route expected to be unusable in the emergency area in the future; and notifying the application of the updated unusable route information may be configured to transmit a notification message, including the identifier of the information about the route expected to be unusable in the future, when the route expected to be unusable becomes unusable.

Notifying the application of the updated unusable route information may be configured to notify the application of the updated unusable route information when the current position of the application is received from the application is in the vicinity of the emergency area.

The method may further include, when all of routes in the emergency area are restored to usable routes, transmitting a notification message for announcing that all of the routes become the usable routes to the application that subscribes to the notification service.

Transmitting the notification message may be configured such that the server transmits the notification message and deletes a resource related to the unusable route information and such that the application discards the unusable route information by receiving the notification message for announcing that all of the routes are restored.

The request to subscribe to the notification service may include a subscription resource that the application creates by setting a notification condition for the notification service.

Receiving the request to subscribe to the notification service may be configured to receive the request including the subscription resource in which the notification condition is set such that the application receives updated information about unusable routes only when the current position thereof corresponds to the updated information.

The method may further include transmitting the location of an emergency area related to the trip parameter to the application when the trip parameter does not include the request to provide unusable route information related to an emergency area.

According to an aspect of the embodiment, there is provided a server apparatus for providing route information related to an emergency area to a terminal that is capable of calculating a route, the server apparatus including a communication unit for communicating with the terminal; and a control unit for providing traffic information for a route that is received from the terminal, wherein the control unit is configured to construct an emergency area resource that includes unusable route information related to an emergency area; to receive trip parameters from multiple applications and transmit a link, through which the emergency area resource is accessible, to an application, the trip parameter of which includes a request to provide unusable route information related to an emergency area; and to transmit a link, through which the same emergency area resource is accessible, to applications that request provision of unusable route information related to the same emergency area.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
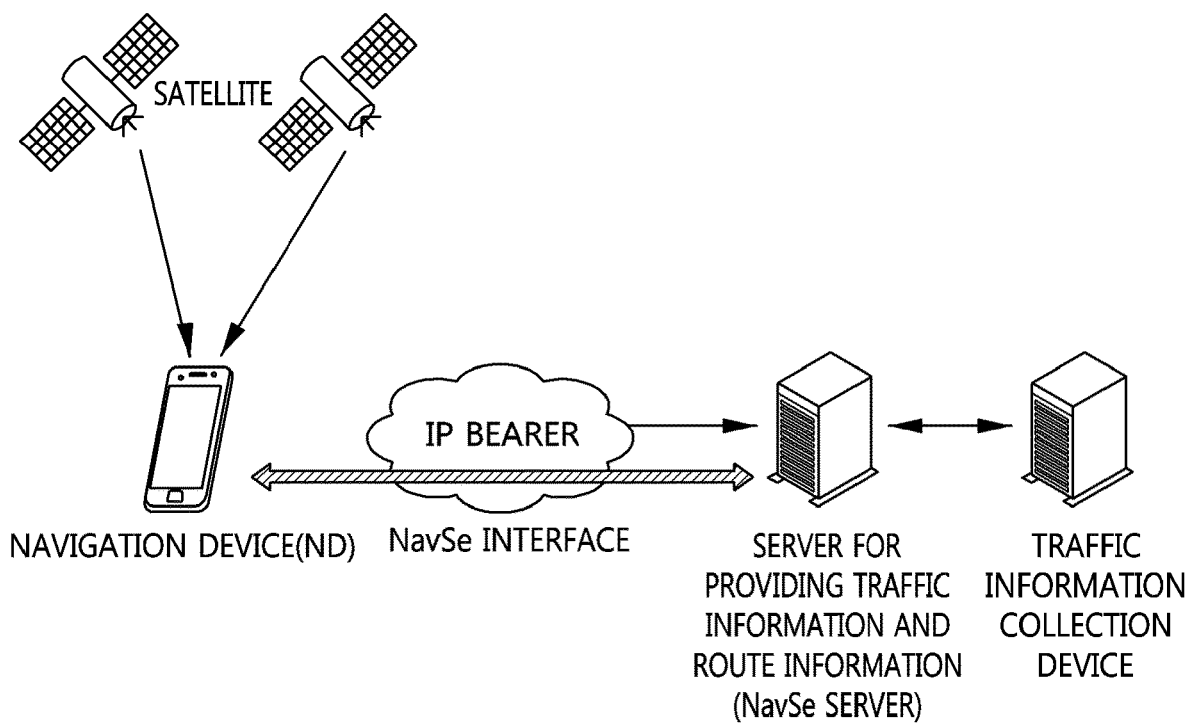
FIG. 1 is a network configuration diagram for explaining the entire NavSe system, which is a navigation system according to the present invention.

Hereinafter, embodiments of the present invention will be described in detail with reference to the accompanying drawings. It should be noted that the same reference numerals are used to designate the same or similar elements throughout the drawings. In the following description of the present invention, detailed descriptions of known functions and configurations which are deemed to make the gist of the present invention obscure will be omitted.

Various terms, such as "first", "second", "A", "B", "(a)", "(b)", etc., can be used to differentiate one component from another, but the substance, order or sequence of the components are not limited by the terms. Throughout this specification, the terms "comprises" and/or "comprising", and "includes" and/or "including" specify the presence of stated elements but do not preclude the presence or addition of one or more other elements unless otherwise specified. Furthermore, the term " . . . unit" or " . . . module" described herein refers to a unit for processing at least one function or operation, and may be implemented as hardware, software, or a combination thereof.

It is to be understood that the detailed description, which will be disclosed along with the accompanying drawings, is intended to describe the exemplary embodiments of the present invention, and is not intended to describe a unique embodiment with which the present invention can be carried out.

The standard documents, OMA-TS-REST_NetAPI_NavSe-V1.0 and OMA-ER-NavSe-V1.0, which are accessible from the URL http://member.openmobilealliance.org/ftp/Public_documents/LOC/Permanent_documents/ at the time of filing this application, are hereby incorporated by reference in their entirety into the present disclosure.

Hereinafter, the terms used herein are briefly defined.

In this specification, an application is an implementation of a set of well-defined but unstandardized functions for performing work on behalf of a user. The application may include software and/or hardware components and associated user interfaces.

In the technical field to which the present invention pertains, a server is an entity for providing resources to clients in response to requests.

In the technical field to which the present invention pertains, a client is a device, a user agent, or some other entity that acts as a receiver of a service.

In this specification, a NavSe application is an entity that is responsible for interacting with a server in order to obtain route information and both real-time and forecast traffic information. Therefore, the NavSe application is installed in a terminal, such as a smartphone, a mobile phone, a navigation device, or the like. In this specification, the terms 'NavSe application', 'terminal', and 'NavSe client' may be used interchangeably with each other. From this aspect, the NavSe application is a kind of client.

In this specification, a NavSe server is an entity that is responsible for providing route information and real-time and forecast traffic information to NavSe applications. From this aspect, the NavSe server is a kind of server.

In this specification, a location Uniform Resource Identifier (URI) is a URI through which the current position of a device can be obtained from a particular location server using a particular dereferencing protocol.

In this specification, a Navigation Device (ND) is an entity for assisting a driver by showing a correct route for reaching a final destination using a Global Navigation Satellite System (GNSS) service. This entity may process real-time and predicted traffic information and dynamically estimate the optimal route depending on user preferences.

In this specification, a lightweight ND is a navigation device that has no function to calculate a route but receives a calculated route from a server by requesting the same therefrom. The lightweight ND accesses the server for route estimation functionalities and for retrieving road shape representations when a local map database is unavailable.

In this specification, a smart ND is a navigation device that is capable of calculating a route or routes using a road network database available on the device itself.

In this specification, a Point Of Interest (POI) describes information about locations, such as the name, the category, the unique identifier, or the civic address.

In this specification, a segment is a unit into which a road is divided. In a street, a road running between intersections is called a 'segment'. In a highway, a road is divided into segments according to a policy for the highway. Traffic congestion or a passing time may be determined on a segment basis. In this specification, the terms 'segment' and 'road section' may be used interchangeably with each other.

In this specification, a segment sequence is a set of one or more consecutive segments. According to need, a segment sequence may comprise only a single segment. For example, when a segment sequence is configured with two or more segments, the end point of the first segment is the same as the start point of the second segment.

In this specification, a polyline is a continuous line used in computer graphics, which consists of one or more line segments and is defined by specifying the endpoints of each segment.

In this specification, route information is information about a set of segments from a defined origin to a defined destination and coordinates of supplementary data.

In this specification, traffic information is information configured with traffic events and network performance parameters related to an area or a route. Also, the traffic information may include current traffic information or upcoming, that is, future, traffic information.

In this specification, a traffic event is information about events related to an area or route imposed or planned by a road network operator (i.e., road works leading to lane closure) or events that occur outside the control of the road network operator (i.e., accidents).

In this specification, a network performance parameter is information about the performance and traffic flow (i.e., the speed, the delay, and the travel time) of road segments present in an area or a route.

In this specification, route information in a full format is a kind of route information including information about all segments from an origin to a destination. Unless otherwise specified, route information indicates a full route.

In this specification, route information in a summarized format is a kind of route information including information about segments that are selected for the summary of information from among all segments of a route from an origin to a destination.

In this specification, unusable route information is information about blocked or destroyed routes in an emergency area that there is a fire, earthquake, a flood, etc.

In the embodiment, a navigation device is a device that is capable of showing a route. The navigation device includes all kinds of electronic devices that are portable or attachable to a portable object, such as a smartphone, a mobile phone, a mobile device, a laptop, a tablet PC, a smart pad, and the like. Hereinafter, the navigation device may be abbreviated to ND.

A NavSe, which is currently being standardized by OMA LOC WG, is included in a framework in which IP-based traffic information is transmitted to a navigation device, and more particularly, in a category in which such information is transmitted in a P2P manner. In the NavSe, a navigation device is categorized into the following two types of navigation devices.

1. Smart ND: A smart ND is a device that is capable of calculating a route by itself without receiving route information from a server. The smart ND requests only real-time traffic information from the server.

2. Lightweight ND: A lightweight ND is a device that is not capable of calculating a route by itself. The lightweight ND requests real-time traffic information including route information from a server.

In the NavSe standard, a smart ND autonomously calculates a route along which a user is to drive based on traffic information provided by a NavSe server and provides the calculated route to the user. However, when a disaster (i.e., a fire, flood, earthquake, epidemic, or the like) has occurred in a certain area, access to some roads may be restricted, and additional road closures may occur. Here, the smart ND cannot provide a normal route to the user because it has no information about roads to which access is restricted. If the NavSE server provides information about unusable routes in the area in which a disaster (i.e., a fire, flood, earthquake, epidemic, or the like) has occurred, the smart ND may provide the user with an appropriate route, from which an unusable route is excluded, using the provided unusable route information.

Hereinafter, the process in which a NavSe application on a smart ND requests unusable route information related to an emergency area or traffic information related to a route estimated by the NavSe application and receives the same from the NavSe server in order to enable the smart ND to provide a user with a route in consideration of unusable routes in the emergency area will be described. Hereinafter, the NavSe application and the NavSe server may be referred to as an application and a server for the convenience of description.

FIG. 1 is a network configuration diagram for explaining the entire NavSe system, which is a navigation system according to the present invention.

As illustrated in FIG. 1, a navigation system according to the present invention may include a navigation device that is capable of accessing a mobile communication network, the mobile communication network for wireless transmission and reception, a traffic information collection device, and a NavSe server for providing traffic and route information.

In the embodiment, a terminal may be connected with an IP network, such as a mobile communication network, Wi-Fi, or the like, as illustrated in the drawing. Also, the terminal has a navigation application for showing a route. Here, the navigation application may receive real-time traffic information by accessing the server and provide guidance for a route. Here, the real-time traffic information is information about the optimal route, which is calculated by the NavSe server and transmitted to the terminal, real-time and predicted traffic information, and additional information related to traffic, such as POIs or weather.

Figure 2:
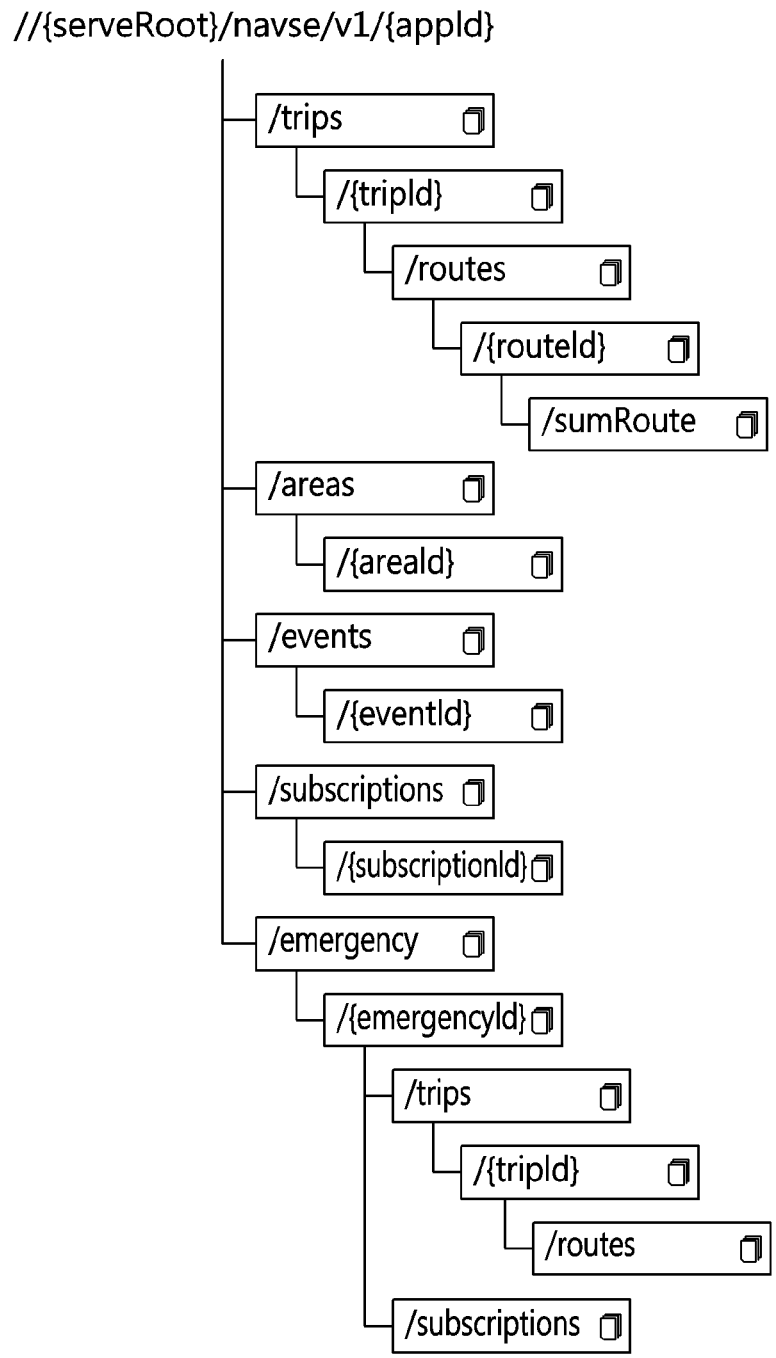
FIG. 2 is a view that shows a resource structure defined in the NavSe standard.

FIG. 2 is a view that illustrates a resource structure defined in the NavSe standard.

Figure 3:
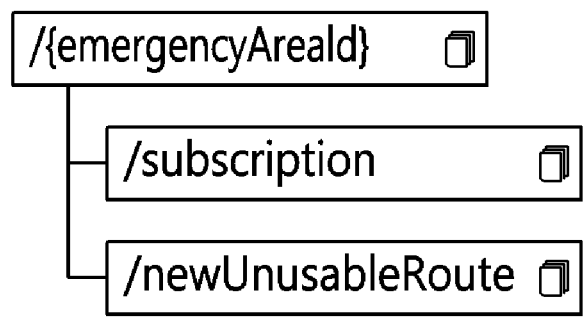
FIG. 3 is a view that shows a resource structure for providing information about unusable routes related to an emergency area according to an embodiment of the present invention.

FIG. 3 is a view that illustrates a resource structure for providing information about unusable routes related to an emergency area according to an embodiment of the present invention.

In the NavSe standard, when an application requests a route or when traffic information for a route is created, the NavSe server newly creates a resource in response to each request made by the NavSe application, and provides a service, as shown in FIG. 2. That is, whenever a request is made, the NavSe resource structure shown in FIG. 2 is newly created, and the service is provided. On the other hand, information about unusable routes related to an emergency area is information common to multiple users. Therefore, only a single resource is created for an emergency area, as illustrated in FIG. 3, and a service may be identically provided to multiple users who are located in the emergency area or who are passing through the emergency area according to the embodiment.

Specifically, when a user creates a 'Trip' resource in the NavSe, subordinate resources are constructed so as to provide different services in response to different requests. However, an 'Emergency Area' resource is solely created regardless of the Trip resource, and a link to the same Emergency Area resource is provided to multiple users who need the same information. Because information is provided to multiple users using only a single resource, the amount of resources on the server that may be wasted by creating resources for respective users in order to provide the same information thereto may be reduced. A user who receives the link may access the Emergency Area resource and be provided with information about unusable routes in the corresponding emergency area.

According to need, a user may subscribe to the Emergency Area resource in order to receive an update of the unusable route information. Also, in the event of road closures, information about which has not been provided through the unusable route information in the Emergency Area resource, the user may upload information about the road closures to a 'New Unusable Route' resource. When new unusable route information is generated in the New Unusable Route resource, the server updates the unusable route information of the Emergency Area resource. Also, in order to announce the update to other users who subscribe to the Emergency Area resource, the server may send the users a notification message for providing the new unusable route information. Because users are allowed to update unusable route information, the server may quickly obtain additional unusable route information.

That is, according to the embodiment, the server may quickly collect information about road closures, quickly update unusable route information, and quickly provide the updated unusable route information to other users who subscribe to a notification service.

Hereinafter, resources proposed for the implementation of the present invention will be briefly described. Additional resources for the implementation of the present invention are defined in the NavSe standard, and a description thereof will thus be omitted in this specification.

1) Trip Structure: This structure represents information that is delivered from a user to a terminal in order to set a route. Basically, information, such as an origin, a destination, and the like, is acquired and transmitted to the server. Information about whether to request unusable route information or information about an emergency area may be included therein.

TABLE 1

| Element | Type | Optional | Description |
|---|---|---|---|
| originWGS84 | Location_Point | Choice | This field represents the origin of the trip for which route information and related traffic information are requested from the server. Location_Point structure is defined in tpeg-locML [TTI LOC]. One element among originWGS84 or originAddress MUST be specified when Trip resource is created. This element is mandatory when the Trip resource is read by the client. This field can be used to indicate the assumed current position of the client, enabling route information updating procedure on the server. In case that unusableRoute field is set to True and the value of destinationWGS84 is identical with this parameter, it indicates that the NavSe application requests the unusable route information related to an emergency area including the position in this parameter. In case that unusableRoute field is set to True and the value of destinationWGS84 is not identical with this parameter, it indicates that the NavSe application requests the unusable route information in an emergency area along the route which the NavSe application drives. |
| originAddress | Civic_Address | Choice | This field represents the location information of an origin, expressed according to IETF Civic Address [RFC5139]. One element among originWGS84 and originAddress MUST be specified when Trip resource is created. In case that unusableRoute field is set to True and the value of destinationAddress is identical with this parameter, it indicates that the |

TABLE 1-continued

| Element | Type | Optional | Description |
|---|---|---|---|
| | | | NavSe application requests the unusable route information related to an emergency area including the position in this parameter. In case that unusableRoute field is set to True and the value of destinationAddress is not identical with this parameter, it indicates that the NavSe application requests the unusable route information in an emergency area along the route which the NavSe application drives. |
| destinationWGS84 | Location_Point | Choice | This field represents the destination of the trip for which route information and related traffic information are requested from the server. Location Point structure is defined in tpeg-locML [TTI LOC]. In case that Trip resource is created for an emergency, this field may not be specified, otherwise one element among destinationWGS84 or destinationAddress MUST be specified when Trip resource is created. In case that sharedRoute field is present and set to True when Trip resource is created, this field may be omitted. This structure is mandatory when the Trip resource is read by the client. In case that unusableRoute field is set to True and the value of originWGS84 is identical with this parameter, it indicates that the NavSe application requests the unusable route information related to an emergency area including the position in this parameter. In case that unusableRoute field is set to True and the value of originWGS84 is not identical with this parameter, it indicates that the NavSe application requests the unusable route information in an emergency area along the route which the NavSe application drives. |
| destinationAddress | Civic_Address | Choice | This field represents the location information of a destination, expressed according to IETF Civic Address [RFC5139]. In case that Trip resource is created for an emergency, this field may not be specified, otherwise one element among destinationWGS84 or destinationAddress MUST be specified when Trip resource is created. In case that sharedRoute field is present and set to True when Trip resource is created, this field may be omitted. This structure may be provided by the server in case the user define a destination using destinationWGS84 structures. In case that unusableRoute field is set to True and the value of originAddress is identical with this parameter, it indicates that the NavSe application requests the unusable route information related to an emergency area including the position in this parameter. In case that unusableRoute field is set to True and the value of originAddress is not identical with this parameter, it indicates that the NavSe application requests the unusable route information in an emergency area along the route which the NavSe application drives. |
| destinationId | xsd:string | Choice | destinationId represents the target user Id. The target user Id is used for retrieving the target user's position and |

TABLE 1-continued

| Element | Type | Optional | Description |
| --- | --- | --- | --- |
| | | | the position is used as a destination of the trip. In case that sharedRoute field is present and set to True when Trip resource is created, this field SHALL be present. |
| destinationIdType | DestinationIdTypeList | Yes | Indicate which type of the target user Id is used in the destinationId element. If destinationId is present and set to True, destinationIdType MUST be present. |
| waypoints | Location_Point [0 . . . unbounded] | Yes | The waypoints may be used to provide additional information about the trip. Location_Point structure is defined in tpeg-locML [TTI LOC]. |
| startingTime | xsd:dateTime | Yes | Starting time of the planned trip. If not present, current time is used. |
| endingTime | xsd:dateTime | Yes | Ending time of the planned trip, provided by the Server based on the route estimation |
| tollRoad | xsd:boolean | Yes | This field carries the information whether toll roads MAY be included in route estimation |
| vehicleType | xsd:string | Yes | This field describes the type of vehicle for which route information is requested. This field SHALL be encoded according to the list of values defined in table RTM01 provided in [TTI RTM] |
| calculateRoute | TripQueryType [1 . . . 2] | Yes | If this parameter is present and set to Route, the server MUST propose, for the defined Trip, a set of routes with related traffic events and performance parameters, and/or alternative routes in case of congestion. If this parameter is set to NoAction or absent, the route will be estimated by the ND. |
| requestedEventsCategories | xsd:string [0 . . . unbounded] | Yes | Categories of traffic information, related to the defined Trip, requested by the application. This field shall be encoded according to the list of values defined in the rtm00 table available in [TTI RTM]. If this field is not present, the server MUST provide traffic information for all defined categories (including network performance parameters). |
| unusableRoute | xsd:boolean | Yes | If this parameter is present and set to True, it represents that the unusable route information related to the emergency area is requested by the NavSe application. If this parameter is specified by the NavSe server, it represents that there is unusable route information of the emergency area related to the Trip resource. And area information of the emergency area is provided by the emergencyArea parameter. |
| emergencyArea | Location Container [0 . . . unbounded] | Yes | This parameter represent area information of the emergency area. This parameter MUST be presented when the unusableRoute parameter is specified by the NavSe server. |
| sharedRoute | xsd:boolean | Yes | If this parameter is present and set to True, it represents that the shared route information is requested by the NavSe application. In case that this field is present and set to True when Trip resource is created, destinationId SHALL be present. |
| link | common:Link [0 . . . unbounded] | Yes | Link to reference route resource. Attribute "rel" must be set to "Route" or "UnusableRoute". |
| resourceURL | xsd:anyURI | Yes | Self-referring URL. The resourceURL SHALL NOT be included in POST requests by the client, but MUST be |

TABLE 1-continued

| Element | Type | Optional | Description |
|---------|------|----------|-------------|
| | | | included in POST requests representing notifications by the server to the client when a complete representation of the resource is embedded in the notification. The resourceURL MUST also be included in responses to any HTTP method that returns an entity body, and in PUT requests. |

2) Emergency Area Structure: This structure is defined in order for a server to provide information about unusable routes to a terminal. This resource is solely constructed and is exclusively present on the server, as opposed to existing resource structures.

TABLE 2

| Element | Type | Optional | Description |
|---------|------|----------|-------------|
| areaDesc | Location Container | No | It describes the emergency area for which the unusable route information is provided. It is encoded according to Location Container structure as defined in tpeg-locML [TTI LOC]. unusable routes |
| unusableRoute | unusableSegment [0 . . . unbounded] | Yes | This field provides the unusable route information pertaining to the emergency area defined in areaDesc field. In case that all routes in the specific area pertaining to the emergency area defined in areaDesc are the unusable routes, unusableArea can be used to represent unusable routes instead of this parameter to reduce a data size.unusable routes |
| expectedUnusableRoute | expectedRoute [0 . . . unbounded] | Yes | This field includes the route information which it is possible to use now but it is expected it will become the unusable route later in the emergency area defined in areaDesc field. |
| unusableArea | Location Container [0 . . . unbounded] | Yes | It represents the specific area pertaining to the emergency area defined in areaDesc parameter and all routes in this specific area are unusable routes. In case that all routes in the specific area pertaining to the emergency area defined in areaDesc are the unusable routes, unusableArea can be used to represent unusable routes instead of unusableRoute parameter to reduce a data size. The maximum area in this parameter is identical with the emergency area in areaDesc parameter. Thus the value of this parameter is identical with areaDesc when all routes in the emergency area are unusable routes. |

TABLE 2-continued

| Element | Type | Optional | Description |
| --- | --- | --- | --- |
| expectedUnusableArea | expectedArea [0 . . . unbounded] | Yes | This field includes the specific area information pertaining to the emergency area defined in areaDesc field which routes in the specific area defined in this field are possible to use now but it is expected they will become the unusable route later. |
| resourceURL | xsd:anyURI | Yes | Self-referring URL. The resource URL SHALL NOT be included in POST requests by the client, but MUST be included in POST requests representing notifications by the server to the client when a complete representation of the resource is embedded in the notification. The resourceURL MUST also be included in responses to any HTTP method that returns an entity body, and in PUT requests. |

The server represents the entire emergency area using an areaDesc parameter, and provides unusable route information to an application using an unusableRoute or unusableArea parameter. When all routes in a specific area are unusable, the area including the routes may be represented using an unusableArea parameter, rather than individually providing information about each of the unusable routes. Accordingly, the amount of data provided to the application may be reduced, and the case in which all routes in the emergency area are unusable may be easily represented (when the value of areaDesc is identical to the value of unusableArea). In the embodiment, an unusableSegment structure that is used to represent an unusable route in the emergencyArea resource is as in the following Table 3. In order to represent unusable routes in a specific area (emergency area), zero or more instances of unusableSegment may be included in the emergencyArea resource.

TABLE 3

| Element | Type | Optional | Description |
| --- | --- | --- | --- |
| originPoint | Location_Point | No | This field represents the origin of the unusable segment encoded according to Location_Point structure as defined in tpeg-locML [TTI LOG]. |
| endpoint | Location_Point | No | This field represents the end of the unusable segment encoded according to Location_Point structure as defined in tpeg-locML [TTI LOG]. |
| midwayPoint | Location_Point [0 . . . unbounded] | Yes | This field is used to unambiguously identify the target road segment. It is encoded according to Location_Point structure as defined in tpeg-locML [TTI LOG]. |
| linkName | xsd:string | Yes | Name of the road or street to which the segment belongs. |

An expectedUnusableRoute parameter and an expectedUnusableArea parameter represent a route that is available at present but is expected to be unusable due to a disaster. The application considers the values of the expectedUnusableRoute and expectedUnusableArea parameters when it calculates a route (for example if it is scheduled to pass through a certain route specified in expectedUnusableRoute or expectedUnusableArea soon, the route can be used, but if it is scheduled to pass through the route later, the route cannot be used). The use of the expectedUnusableRoute and expectedUnusableArea parameters facilitates the update of the route in the application. In the embodiment, an expectedRoute structure that is used to represent the road expected to be unusable in the emergencyArea resource is as in the following Table 4. In order to represent roads expected to be unusable, zero or more instances of expectedRoute may be included in the emergencyArea resource.

TABLE 4

| Element | Type | Optional | Description |
| --- | --- | --- | --- |
| id | xsd:string | No | Identity of expected unusable route information |
| expectedRoute | unusableSegment [1 . . . unbounded] | No | This field includes segment information which it is possible to use now but it is expected it will become unusable later. |

In the embodiment, an expectedArea structure that is used to represent an area expected to be unusable in the emergencyArea resource is as in the following Table 5. In order to represent areas expected to be unusable, zero or more instances of expectedArea may be included in the emergencyArea resource.

TABLE 5

| Element | Type | Optional | Description |
| --- | --- | --- | --- |
| id | xsd:string | No | Identity of expected unusable area information |
| expectedArea | Location Container | No | This field includes the area information which routes in the specific area defined in this field are possible to use now but it is expected they will become the unusable route. It is encoded according to Location Container structure as defined in tpeg-locML [TTI LOC]. |

Also, when there is new unusable route information, other than already provided unusable route information, the application creates a new UnusableRoute resource in the server, thereby providing the new unusable route information to the server. Here, the newUnusableRoute resource is as in the following Table 6.

TABLE 6

| Element | Type | Optional | Description |
| --- | --- | --- | --- |
| newUnusableRoute | unusableSegment [0 . . . unbounded] | Yes | This field represents the new unusable route information detected by the NavSe application pertaining to the emergency area defined in areaDesc field. This field is used when the NavSe application provides the new unusable route information to the NavSe server. |

3) Subscription Structure: This structure may be used by the application to set the automatic reception of a notification message from a server when new unusable route information related to the emergency area is present. When the application installed in the ND according to an embodiment of the present invention subscribes to a notification service for information updates, the application may receive a notification message whenever information about unusable routes is updated. Here, when it monitors information about the unusable routes over the web or the like, the application may immediately receive continually updated information about unusable routes.

However, a user who is provided with a route through the application may not need the updated information about the unusable routes if the user is far away from an emergency area while the user is moving along the route, or the user may not immediately need continually updated information about unusable routes. Further, network resources used to receive the continually updated information about unusable routes may be wasted if the user does not need the information. The present invention proposes a method for solving these problems.

The application may receive information about unusable routes by accessing the resources of the server apparatus in which the corresponding information is stored, and may then transmit a request to subscribe to a notification service for receiving updated information about the unusable routes.

Here, when the application creates a Subscription resource in order to transmit the request to subscribe to a notification service, the application may set desired notification conditions. To this end, parameters added in a Subscription resource are as shown in the following Table 7.

TABLE 7

| Element | Type | Optional | Description |
|---|---|---|---|
| callbackReference | common:Callback Reference | No | Client's Notification endpoint and parameters. |
| link | common:Link [1 . . . unbounded] | No | References to resources subscribed by the application. Attribute "rel" indicates the type of resource subscribed. It may assume the following values: "Trip": in order to get notified about: new traffic events and performance parameter related to the set of routes defined for the trip new alternative route proposals "Area": in order to be notified of new traffic events and performance parameters updates "UnusableRoute": in order to be notified of updated unusable route information "SharedRoute": in order to be notified of updated destination information with remaining time and distance Attribute "href" specifies the URL of a subscribed resource. Subscribed resources' type must be the same as that specified in "rel" attribute. Note: notified information for an existing route are: a) new traffic events provided with links included in the route resource itself; b) performance parameters available in updated performanceParameter field of segment structures. |
| trackingProc | xsd:boolean | Yes | If present and set to True, the application communicates to the server the user's availability to provide position information through an external location application. |
| deviceLocationURI | xsd:anyURI | Yes | This parameter is used by the server for accessing Navigation Device position information. |
| allUpdates | xsd:boolean | Yes | When the ND subscribes to a notification service in order to receive information about unusable routes in a emergency area and updates thereon, if the value of this field is set to True, the ND may be notified of all updated information. (If the ND intends to receive all updated information about unusable routes in a emergency area, this field must be included, but otherwise, this field may be omitted.) |
| currentPos | Location_Point | Yes | When the ND subscribes to a notification service in order to receive information about unusable routes in a |

TABLE 7-continued

| Element | Type | Optional | Description |
|---|---|---|---|
| resourceURL | xsd:anyURI | Yes | emergency area and an update thereon, if the value of the allUpdates field is not True but False, the ND may provide information about the current position thereof using this field. Self-referring URL. The resourceURL SHALL NOT be included in POST requests by the client, but MUST be included in POST requests representing notifications by the server to the client when a complete representation of the resource is embedded in the notification. The resourceURL MUST also be included in responses to any HTTP method that returns an entity body and in PUT requests. |

When the application creates a Subscription resource in order to subscribe to a notification service for receiving updated information, if the application wants to receive all updated information, the application may create a Subscription resource in which notification conditions are set so as to include an allUpdates parameter, and may transmit a subscription request including the Subscription resource. When it is determined that the allUpdates parameter is set to 'True' in the notification conditions included in the subscription request from the application, the server apparatus may determine that the application wants to receive all updated information about unusable routes, and may thus transmit a notification message including all updated information about unusable routes to the corresponding application.

However, if the application wants to receive an update on information about unusable routes in an emergency area only when it needs the information, the application may create a Subscription resource in which the allUpdates parameter is omitted or in which the allUpdates parameter is set to 'False' in the notification conditions, and may then transmit a subscription request including the Subscription resource.

Here, the application may include information about the current position of the ND, in which the application is installed, in a currentPos parameter. Here, when the ND, in which the application is installed, reaches the vicinity of an emergency area, the application may update the position information of the currentPos parameter to the current position of the ND.

Here, the server apparatus may check the current position of the ND using the position information in the currentPos parameter and determine whether the application needs updated information about unusable routes in the emergency area because the ND reaches the vicinity of the emergency area. If the ND is located in the vicinity of the emergency area, the server apparatus may transmit a notification message that includes updated information about unusable routes in the vicinity of the emergency area.

Accordingly, the server apparatus and method according to an embodiment of the present invention may provide updated information about unusable routes only when the ND needs the information or only when the ND is located in a position at which the updated information is required. Accordingly, the server apparatus and the ND may prevent resources from being wasted.

4) Notification Structure: The server announces that there is updated unusable route information using Notification, and provides a link through which the updated unusable route information can be received.

TABLE 8

| Element | Type | Optional | Description |
|---|---|---|---|
| link | common:Link [1 . . . unbounded] | No | Link to updated resources. Attribute "rel" attribute indicates type of resource updated and may assume "Trip", "Route", "Event", "Area" and "UnusableRoute" values. |
| expectedInfoUpdate | xsd:string | Yes | The value of this parameter is an ID of expectedUnusableRoute or expectedUnusableArea provided in EmergencyArea. This parameter represents that the route included in expectedUnusableRoute or expectedUnusableArea indicated by this field becomes the unusable route. |
| noUnusableRoute | xsd:boolean | Yes | This field indicates whether all of the unusable routes in a emergency area have been restored to usable routes. In this case, the value of this field may be set to True. |

The server provides information about roads that are accessible at present but are expected to be unusable (expectedUnusableRoute, expectedUnusableArea) using emergencyArea. In the conventional method, when the road expected to be unusable becomes usable, the server is required to deliver 'Notification' including the link to the updated unusable route information such that application may be provided with the updated unusable route information. In this case, if the id of the already provided expectedUnusableRoute or expectedUnusableArea parameter is included in the Notification to be transmitted to the application, it is possible to announce that the route expected to be unusable included in the already provided information becomes unusable. As a result, when the unusable route information is updated, the number of access attempts made to the server in order for the user to receive the updated unusable route information may be reduced, whereby overload of access to the server in emergencies may be prevented and the ND may quickly calculate a new route and provide the same to the user. Also, the server may create a resource for providing information about unusable routes in an emergency area, and the application may be provided with the information about the unusable routes by accessing the single resource created by the server, and may transmit a request to subscribe to a notification service in order to receive updated information about the unusable routes. Here, services that use the information about the unusable routes may be different in respective applications, and the period during which the information is used may be different in respective applications.

In this regard, the conventional method may have the following three problems.

1. When an unusable route in an emergency area becomes accessible, the server may send a notification message to all of the NDs that subscribe to notification service for receiving updated information about unusable routes. Here, all of the NDs, having received the notification message, may confirm that the unusable route is restored to usable route by accessing the resource provided by the server. However, because all of the NDs that subscribe to the notification service simultaneously access the NavSe server, there may be a problem caused due to simultaneous access by multiple NDs to the NavSe server.

2. The ND, having confirmed that the unusable route has been restored to usable routes, may unsubscribe from the notification service. However, if the ND has already terminated a service using the corresponding information, the ND does not access the NavSe server even though it received the notification message, and the ND may not unsubscribe from the notification service. Because the ND does not unsubscribe from the notification service, the server retains the resource for providing information about the unusable route, whereby there may be a problem in which the server retains a resource that is not used any longer.

3. If the ND has information about unusable routes, when all of the unusable routes have been restored to usable routes, the ND may reflect information thereabout to a route and provide a new route to a user. However, there may be a network problem in an emergency area, and the ND that did not obtain information about the restored roads due to the network problem may continue to provide a route based on the incorrect information.

In order to solve the above-described problems, the method according to an embodiment of the present invention may enable the server to notify the application of the fact that all of the roads in an emergency area have been restored to usable routes using a notification message.

Here, when all of the roads in the emergency area have been restored to usable routes, the server may notify all of the applications, which subscribe to a notification service, of the fact that all of the roads in the emergency area have been restored to usable routes using a notification message.

Here, when all of the unusable routes in the emergency area have been restored to usable routes, the server may transmit a notification message including a 'noUnusableRoute' parameter to all of the applications that subscribe to a notification service.

Here, all of the applications, having received the notification message, may discard all information about the unusable routes, recognize all of the roads as accessible roads, and provide a user with a route to which all of the roads recognized as accessible roads are reflected. Here, the server may delete all of the resources related to information about the unusable routes.

Through the method according to an embodiment of the present invention, when a notification service is provided, simultaneous access by multiple applications to a server may be prevented, and the application may quickly update route information by being notified of the fact that unusable routes are restored to usable routes. Also, the server may be prevented from maintaining unnecessary resources.

Figure 4:
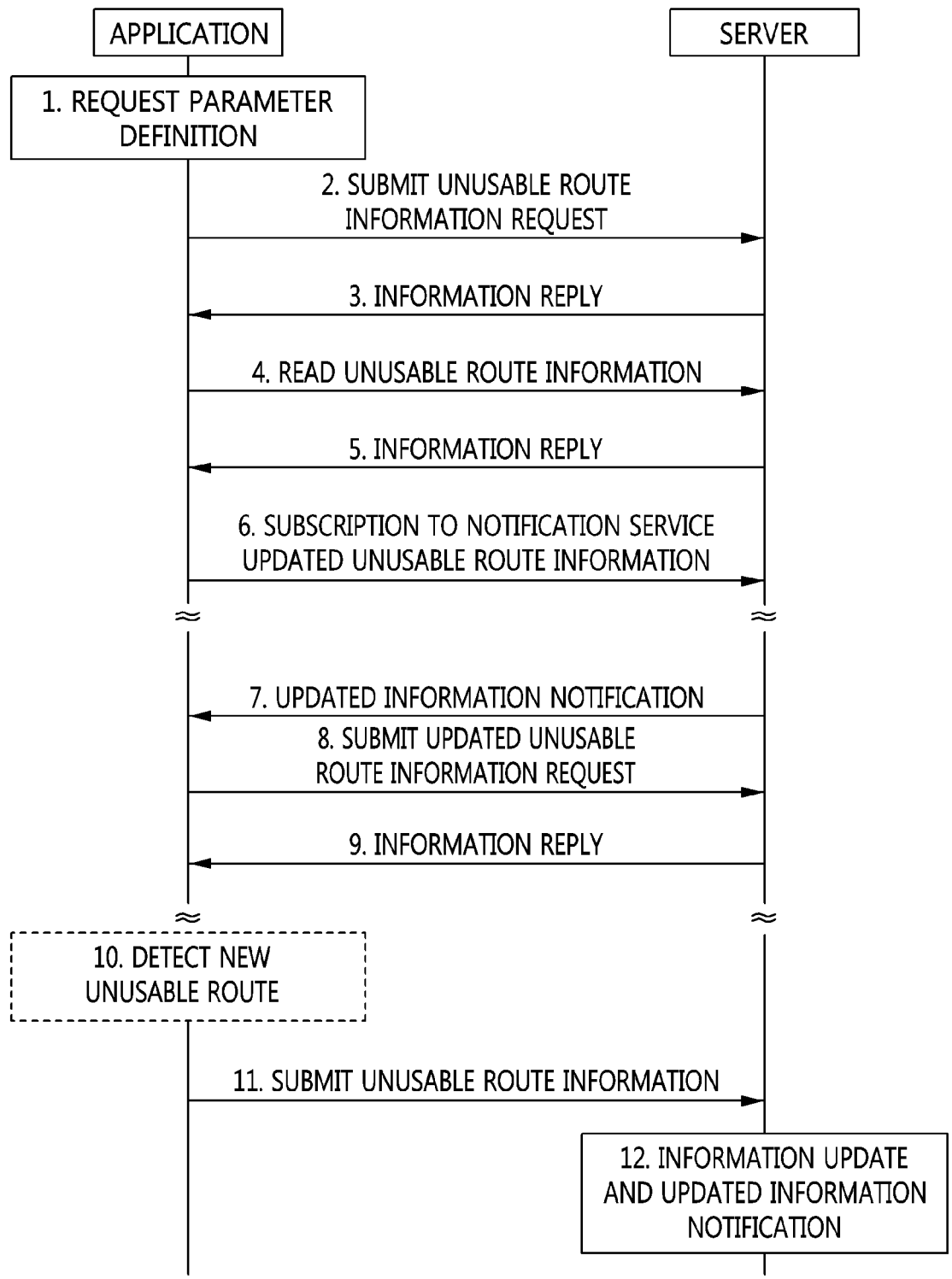
FIG. 4 is a flowchart that shows the process in which an application requests and receives unusable route information from a server according to an embodiment of the present invention.

FIG. 4 is a flowchart that illustrates the process in which an application requests unusable route information from a server and receives the same therefrom according to an embodiment of the present invention. Hereinafter, the process in which a server provides unusable route information related to an emergency area to an application will be described with reference to FIG. 4.

1. A user sets a journey parameter for requesting unusable route information related to a specific area (emergency area).

2. An application transmits a request for link information, through which the application can access unusable route information, to a server.

3. The server responds to the application with link information, through which the application can access unusable route information.

4. The application requests unusable route information from the server using the provided link.

5. The server provides unusable route information related to the specific area (emergency area), which is requested by the application.

6. The application subscribes to a notification service for receiving updated unusable route information.

7. When the unusable route information is updated, the server sends a notification message for announcing the update to the application, which subscribes to the notification service.

8. The application requests the updated unusable route information. If the application has received the identifier of information about a route expected to be unusable at the above step 7, this step (step 8) and the following step (step 9) may be skipped.

9. The server provides the updated unusable route information.

10. The user detects a new unusable route while using the navigation service.

11. The application transmits new unusable route information to the server.

12. The server updates the unusable route information related to the specific area using the received unusable route information, and sends an update notification message to other applications that subscribe to the notification service for the corresponding unusable route information.

The unusable route information may continue to change because the real-time road conditions change due to a disaster. Accordingly, a method for efficiently providing the application with the continually updated unusable route information is required. According to the embodiment, a user may request information related to unusable routes using the NavSe application in the following three cases.

(a) The application requests unusable route information in order to calculate a route for escaping from an indoor area, such as a building, a basement, or the like, or from a small outdoor area when a disaster (fire or destruction) has occurred in the corresponding area. In this case, the ND provides the user with an indoor navigation service or an outdoor navigation service for the emergency area, along with unusable route information related to the specific area.

(b) When a user who uses a general navigation service detects the presence of an emergency area on the route for reaching his or her destination and requests unusable route information related to the corresponding emergency area, the ND provides the user with the outdoor navigation service, along with unusable route information related to the emergency area on the route.

(c) When the user who uses a general navigation service requests only general information because he or she does not detect the presence of an emergency area on the route for reaching his or her destination, the ND provides the user with the outdoor navigation service, along with unusable route information related to the emergency area, in which case the process for notifying the user of the presence of the emergency area on the route precedes the process of providing unusable route information.

Hereinafter, the process in which the application requests unusable route information related to an emergency area from the server and receives the same therefrom will be described with respect to the respective cases, and the process in which the application and the server construct resources will be described with reference to the drawings.

The method described in case (a) is used when a user requests unusable route information in order to calculate a route along which the user can move or escape in the event of a disaster in a limited space, such as an indoor space, including a building and a basement, or a small outdoor space.

The NavSe application may provide a service for a navigation device. Further, because the service can be provided even to a device without a navigation function using a web connection, the NavSe application may be used to provide a service for checking unusable routes in an area in which a disaster has occurred. For example, there may be a use case in which, in order for a fire department to efficiently perform rescue activities, unusable routes in a burning building are checked over the web, and rescue workers may be instructed to move in consideration thereof. Also, when a disaster, such as a fire or the like, has occurred indoors, such as in a building or the like, it may be difficult for a service provider to check unusable routes. In this case, a rescue worker who enters the building may provide unusable route information to the NavSe server using the NavSe application, someone in a situation room, who contacts the rescue worker through another method, may provide unusable route information to the NavSe server through a web connection so that the unusable route information is provided to users, or unusable routes may be checked using a CCTV or the like in the situation room or via maintenance facilities of the building and provided to the NavSe server through a web connection.

The user of the application defines a trip parameter for setting an origin, a destination, an indicator about whether to request unusable route information related to an emergency area, and other environments. Here, when the indicator of the trip parameter indicates that the application requests unusable route information and when the origin is identical to the destination, this indicates that the application requests unusable route information related to an emergency area including the location of the origin and the destination (corresponding to case (a)). If the origin of the trip parameter differs from the destination thereof, this indicates that the application requests unusable route information related to a certain area on the route from the origin to the destination (corresponding to case (b)).

When the application uploads the trip parameter to the server, the application may access unusable route information via a link provided by the server. Because the unusable route information is common to users who want to obtain unusable route information related to an emergency area, the server creates a single emergency area resource for providing the unusable route information and provides the users with a link to the unusable route information in order to reduce the number of resources used in the server. Here, the server may also provide information about routes that are currently available but are expected to be unusable in the future, along with the link.

After it accesses the unusable route information, the application automatically subscribes to a notification service without interaction with a user. When another route becomes unusable in the emergency area, a notification message is triggered by the server and sent to the application. The application may access the updated traffic information.

When the route expected to be unusable, information about which is already provided by the server, becomes unusable, the server sends a notification message including the id of the information about the route expected to be unusable to the application. After it receives the notification message, the application autonomously updates unusable route information using the provided information about the route expected to be unusable. The notification message, including the id of the information about the route expected to be unusable and the id of information about the unusable route, is used to reduce the number of accesses by applications to the server.

The application receives information about a new unusable route from the user of the ND. The server updates unusable route information using the information about the unusable route, which is uploaded from the application.

Figure 5:
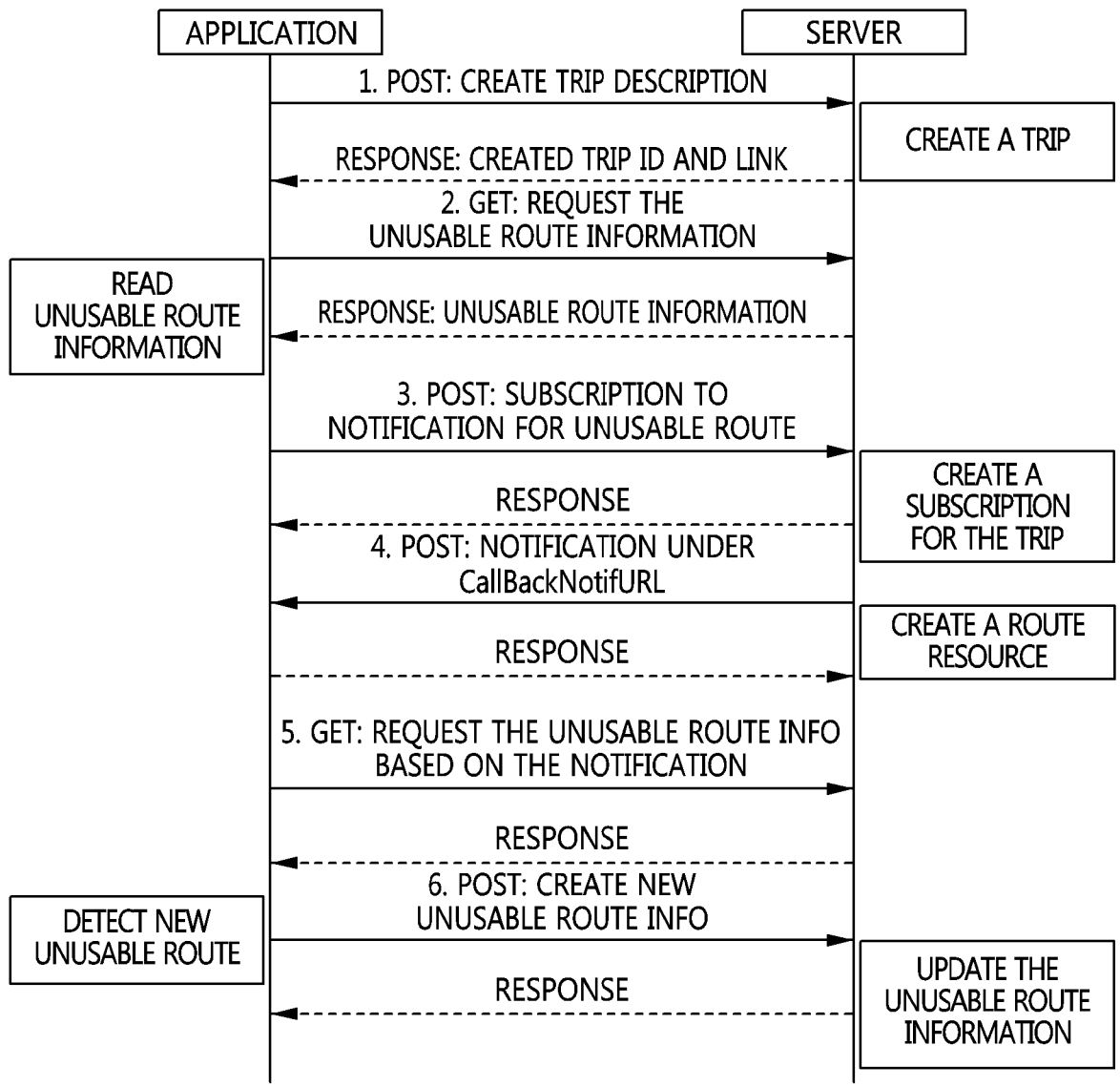
FIG. 5 is a flowchart that illustrates the operations of an application and a server according to an embodiment of the present invention.

FIG. 5 is a flowchart that shows the operations of an application and a server according to an embodiment of the present invention. Through the process shown in the flowchart of FIG. 5, the server may provide unusable route information related to a certain emergency area to the application.

1. The user of an application defines journey parameters, and the application creates a trip description for requesting unusable route information related to the emergency area designated by the user using the journey parameters and sends the trip description to the server using the POST method. The server replies with a "trip" resource created so as to include a link through which the application may access unusable route information related to the emergency area.

2. The application accesses the unusable route information.

3. The application subscribes to a notification service for update of the unusable route information.

Here, the application may set notification conditions for the notification service and transmit a subscription request including a created Subscription resource to the server.

Here, the server may receive the request to subscribe to the notification service including the Subscription resource in which a notification condition is set so as to receive updated information about unusable routes only when the information corresponds to the current position.

Here, when the application creates a Subscription resource in order to subscribe to the notification service for the update, if the application wants to receive all updated information, the application may create a Subscription resource in which a notification condition is set so as to include an allUpdates parameter, the value of which is 'True', and transmit the subscription request.

Conversely, if the application wants to receive an update on information about unusable routes in an emergency area only when the application needs the updated information, the application may create a Subscription resource in which a notification condition does not include an allUpdates parameter or in which the allUpdates parameter is set to 'False', and may then transmit the subscription request.

Here, the application may include information about the current position of the ND, in which the application is installed, in a currentPos parameter. Here, when the ND reaches the vicinity of the emergency area, the application may update the position information of the currentPos parameter to information about the current position of the ND.

4. When the unusable route information is updated or when a route expected to be unusable becomes unusable, the server announces the update to the application.

Here, when it confirms that the allUpdates parameter is set to 'True' in the notification condition included in the subscription request of the application, the server determines that the application wants to receive all updates on the information about unusable routes, and may transmit a notification message including all updates on the information about unusable routes to the corresponding application.

Here, the server may detect the current position of the ND using the position information of the currentPos parameter and determine whether the application needs the update information by checking whether the ND reaches the vicinity of the emergency area. When the ND in which the application is installed is located in the vicinity of the emergency area, the server may transmit a notification message including the updated information about unusable routes near the emergency area.

5. The application accesses the updated route information.

6. When the user of the ND detects a new unusable route, the user uploads information thereabout to the server through the application. The server updates unusable route information.

The method described in case (b) is used when a user, who drives along a route using a general navigation service, detects the presence of an emergency area on the corresponding route, and the NavSe application requests unusable route information related to the detected emergency area when it requests traffic information from the NavSe server.

The user of the application defines journey parameters, such as an origin, a destination, road preferences, and the like, and these parameters are uploaded to the server through the application. The smart ND estimates one or more geographical areas related to the defined journey and accesses traffic information (events and performance parameters) for the selected area, which is reported by the server. The ND proposes a set of routes for the defined journey in order to avoid congested road segments using the traffic information, and the user selects a reference route from among the proposed routes.

The application uploads the selected route to the server that is to be accessed for traffic information (real-time and forecasted performance parameters). Also, in order to estimate the optimal route in real time, the application subscribes to a trip notification service for receiving updated traffic information related to the route in use (performance parameters and traffic events for the selected categories).

If the application requests unusable route information related to an emergency area when it defines and uploads the journey parameters, the server replies with an additional link through which the application may access unusable route information. Because the unusable route information is common to users who want to obtain unusable route information related to an emergency area, the server creates a single emergency area resource for providing unusable route information and provides a link to the unusable route information to the users who want to access the unusable route information in order to reduce the number of resources on the server. The application accesses the unusable route information, and the ND may calculate a set of routes for the defined journey based on the unusable route information.

When the application does not request unusable route information related to an emergency area at the time of defining and uploading the journey parameters but there is an unusable route in the emergency area related to the journey parameter, the server replies with information about the emergency area and an additional link through which information about the unusable route is accessible. The application may access the information about the unusable route in order to calculate the route. Also, in order to estimate the optimal route in real time, the subscription to the notification service for notification of updates to the information about unusable routes is required.

Because unusable route information related to the emergency area can be frequently updated, the application subscribes to the notification service when the ND reaches the vicinity of the emergency area in order to reduce the number of notification by the server. When the ND reaches the vicinity of the emergency area, the application uploads the current position of the ND with the server. The server replies with a link through which the application may access the latest unusable route information. The application accesses the unusable route information and subscribes to a notification service for an update of the unusable route information.

When an accident or severe congestion has occurred near the current route or when a segment of the route in use becomes unusable, a notification message is triggered by the server and sent to the application. The application accesses updated traffic information and/or updated unusable route information related to the current route using the notification message, and the ND estimates an alternative route and requests traffic information related thereto from the server.

If the alternative route is less congested than the previous route, the ND deletes the previous route because the ND is no longer interested in the notification service for the corresponding resource. However, if the performance of the proposed alternative route is poor, the ND may look for a less congested route before deleting the previous route. The ND repeatedly estimates a set of alternative routes and uploads the same to the server. The application may select an option for uploading a partial route for bandwidth optimization.

Based on the travel distance, the application periodically reports the current position thereof to the server. The server may delete the segments already travelled by the vehicle from the route representation using the updated position information. In the next step, when the vehicle deviates from the planned route, the ND estimates a new route uploaded to the server in order to access new traffic information. The new route replaces the previous route, and the notification service includes a new resource.

Also, when all of the routes in the emergency area have been restored to usable routes, the server may transmit a notification message for announcing that all of the routes have been restored to usable routes to the application that subscribes to the notification service.

Here, the server transmits the notification message to the application and deletes the resource related to the information about the unusable routes, and the application may discard the information about unusable routes after it receives the notification message that announces that all of the routes have been restored.

Here, in order to announce that all of the routes have been restored, the server may create a notification message in which the 'noUnusableRoute' parameter is set to 'True' and transmit the notification message to the application.

Figure 6:
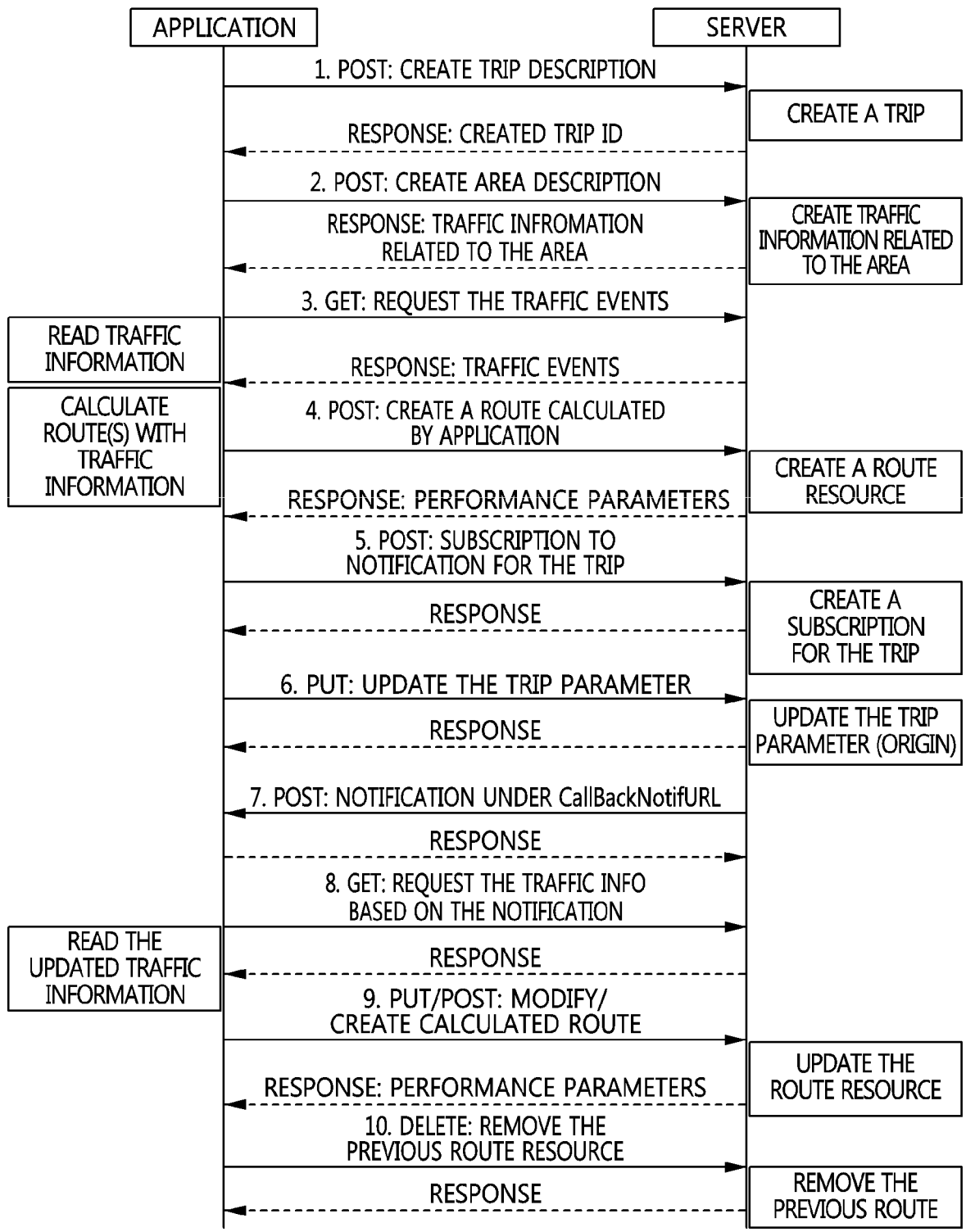
FIG. 6 is a flowchart that illustrates the operations of an application and a server according to another embodiment of the present invention.

FIG. 6 is a flowchart that shows the operations of an application and a server according to another embodiment of the present invention. Through the process shown in the flowchart of FIG. 6, the server may provide the application with information about unusable routes related to a certain emergency area that can be passed through during the journey.

1. The user of the application defines journey parameters, and the application creates a trip description using the journey parameters and sends the trip description to the server using the POST method. The server replies to the application with a representation of a "trip" resource that is created so as to include a trip ID and defined parameters. Here, the trip description specifies that the application does not request a route estimation function. When the application requests an unusable route, the trip description specifies that unusable route information is requested. If there is information about unusable routes in an emergency area related to the journey parameter but a request for an unusable route is not specified, the server may reply with a response in which the fact that an emergency area and an unusable route related to the journey parameters are present is specified. In this process, that is, when it creates trip information at step 1, the application includes an unusable-Route field in the Trip structure in order to indicate that there is an emergency area on the route and that the application wants to receive information about unusable routes in the emergency area. The server provides the application with a link through which the application receives information about unusable routes in the emergency area.

2. The application creates an area description for requesting traffic information related to the journey and sends the same to server using the POST method. Here, the area structure is identified with origin and destination coordinates. The server may select a category for traffic events for the area related to the described trip and reply with traffic information including the selected category. When there is severe congestion, the server may reply with performance parameters for the area around the origin.

3. The application reads the traffic information that is reported by the server in response to a request for traffic events. This information and the performance parameter acquired at step 2 are used by the ND to estimate a set of routes that avoid critical route segments affected by accidents, construction, or congestion. When the application or server specifies a parameter for unusable route information at step 1, the application reads unusable route information using the reported link. At step 3, the application collects road information of the route that is being used from the NavSe server. Here, the NavSe application also receives information about unusable routes in the emergency area using the link received at step 1.

4. The application uploads an estimated route (selected by a user from a set of routes proposed by the ND) to the server. The server replies with a representation of the 'route' resource including performance parameters and a link to traffic events.

5. The application subscribes to a notification service for receiving information about the area selected at step 2 and the route uploaded at step 4. When the ND reaches the vicinity of the emergency area while using information about unusable routes, the application modifies the origin field of the trip resource and reads the latest information about unusable routes using the reported link. Then, the application subscribes to a notification service for unusable route information. The application is notified of performance parameters and traffic events related to the selected area and the route uploaded for the trip. The application subscribes to a notification service for unusable route information when the ND reaches the vicinity of the emergency area. The application is notified of an update of the unusable route information.

6. The application periodically updates the current position thereof and transmits the same to the server in order to modify the origin field of the trip resource. This operation is triggered whenever the distance by which a vehicle drives from the previous reporting position becomes a certain distance. The server deletes the already travelled segment from the route using this information. If the application acquires the location information of an emergency area using the representation of an emergencyArea resource connected with a link at step 1, when the current position of the user approaches the emergency area, the application transmits the current position thereof to the server. The server, which received the position of the application, provides a link through which the application may receive the current emergencyArea resource, and the application receives new unusable route information through the corresponding link and subscribes to a notification service for receiving the updated unusable route information.

That is, the application subscribes only to a general notification service at step 5, and subscribes to a notification service for receiving updated unusable route information only when it reaches the vicinity of the emergency area or is located inside the emergency area.

Through the above-described method, the server and the application provide the latest or updated unusable route information only when the application reaches the vicinity of the emergency area, rather than providing the updated information whenever new unusable route information related to the emergency area is generated. Accordingly, the number of operations performed between the server and the application may be reduced.

7. When the server detects traffic events, severe congestion, and/or new unusable routes near the proposed route, the server notifies the application of information thereabout.

8. The application accesses the updated traffic information (selected traffic events and performance parameters) related to the route or the updated unusable routes.

The server provides the updated traffic information for the current route and/or the updated unusable routes to the application via a specified link. Also, when the corresponding road information is updated, the server notifies the application of the presence of the update of information as described in step 7, and the application is provided with the updated information from the server as described in step 8.

9. The ND decides to recalculate a new route under the following conditions:

a) when the application collects updated traffic information at step 8, b) when the ND detects that the vehicle deviates from and is diverting from the defined route, and c) when the application receives the updated unusable routes and receives information indicating that the current route is affected by the updated unusable routes.

The application modifies an existing route through a PUT method or creates a route factory through a POST method depending on whether to maintain the previous information, thereby uploading the newly calculated route to the server. The server replies with a representation of a route resource, which contains performance parameters. This step may be repeated until the performance of the recalculated route is better than the previous route. However, in order to avoid going into a loop, the application can define a new area description to acquire traffic information in the area in which the repeated query occurs with operations similar to those described in step 2 and step 3.

10. The application deletes the previous routes from the set of proposed routes when the previous routes are no longer used. The application deletes the newly calculated route from the set of proposed routes when the performance thereof is worse than the route that is being used. The application unsubscribes from the notification service for the previous route using a DELETE method. (If the new route replaces the old one through a modification operation, the DELETE method is not necessary).

The-above described case (c) corresponds to the case in which a user does not detect the presence of an emergency area on the route that is being used and uses a general navigation service.

At the first step of the basic procedures performed by the smart ND, the NavSe application creates a trip resource in the NavSe server. Although the application does not request information about unusable routes in an emergency area when it defines and uploads a trip parameter, unusable routes may be present in the emergency area related to the trip parameter. In this case, the server may reply with information about the emergency area and an additional link through which the application can access information about unusable routes. The application may access the information about unusable routes in order to calculate a route. The NavSe server tells the NavSe application that there may be an emergency area on the planned route by including an unusableRoute parameter, and provides the location information of the area in which the disaster has occurred using the emergencyArea parameter. Also, the NavSe server provides a link through which the application can receive unusable route information using a link parameter.

After it checks the area in which a disaster has occurred using the emergencyArea parameter, the NavSe application calculates a route by circumventing the emergency area. Alternatively, the NavSe application receives unusable route information via a link, calculates a route using the received unusable route information, and provides the calculated route. After that, the process of receiving unusable route information via a link and calculating a route using the information is the same as described in case (b).

Figure 7:
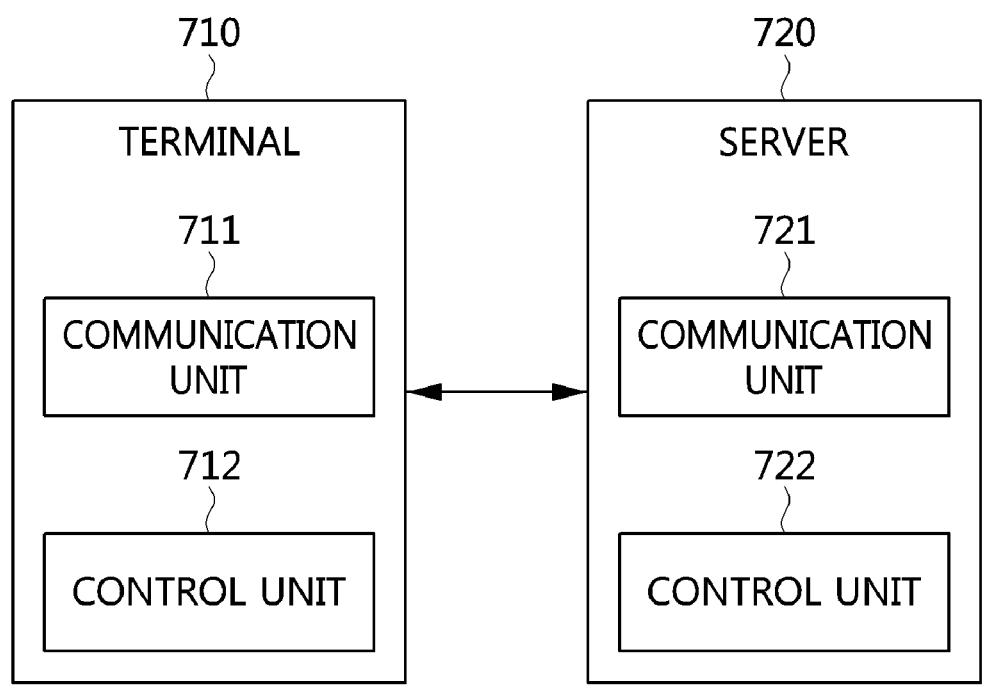
FIG. 7 is a block diagram of a terminal and a server configured to implement embodiments of the present invention.

FIG. 7 is a block diagram of a terminal and a server for implementing embodiments of the present invention. The respective components illustrated in FIG. 7 may be implemented as hardware chips, or may be implemented as software, the functions of which, corresponding to the respective components, are executed by a microprocessor.

The terminal 710 may include a communication unit 711 for communicating with a server 720 and a control unit 712 for calculating a route using traffic information received from the server 720. The server 720 may include a communication unit 721 for communicating with the terminal 710, and a control unit 722 for collecting and processing traffic information based on parameters related to a trip, such as an origin, a destination, and the like received from the terminal.

An embodiment of the present invention, which will be described with reference to FIG. 7, is an embodiment in which the terminal 710 is a smart ND. In the embodiment, the control unit 722 of the server 720 may be configured to construct resources including route information related to an emergency area, to receive trip parameters from multiple applications, to select a terminal 710, to which route information related to the emergency area is to be provided, based on the trip parameter and transmit a link through which the resource is accessible, and to transmit a link, through which the same resource is accessible, to the terminals 710 to be provided with route information related to the same emergency area. Here, the resource may include information about routes that are unusable in the emergency area at present and information about routes expected to be unusable in the future.

Also, the control unit 722 of the server 720 receives a request to subscribe to a notification service related to the emergency area from the terminal 710, and announces updated route information to the terminal 710 that subscribes to the notification service when the route information is updated.

Also, when the route expected to be unusable becomes unusable, the control unit 722 transmits a notification message containing the id of information about the corresponding route, thereby efficiently delivering the updated information to the terminal 710 and preventing overload of access to the server 720.

Also, the control unit 722 of the server 720 receives the current position of the terminal 710 therefrom. Accordingly, when the terminal 710 approaches the emergency area, the control unit 722 may notify the terminal 710 of the updated route information.

Also, when a request for route information related to an emergency area is not included in the trip parameter, the control unit 722 of the server may transmit the location of the emergency area related to the trip parameter.

Also, when all of the routes in the emergency area have been restored to unusable routes, the control unit 722 may transmit a notification message for announcing that all of the routes have been restored to usable routes to the terminal 710 that subscribes to the notification service.

Here, the control unit 722 may transmit the notification message and delete the resource related to information about the unusable routes, and the terminal 710, having received the notification message for announcing that all of the routes have been restored, may discard the information about the unusable routes.

Here, the request to subscribe to the notification service may include a subscription resource, which the terminal 710 creates by setting a notification condition for the notification service.

Here, the control unit 722 may receive the request to subscribe to the notification service, in which the notification condition is set so as to receive updated information about unusable routes only when the updated information corresponds to the current position.

Although the processes illustrated in FIGS. 4 to 6 have been described as being sequentially performed, this is only an exemplary description of the technical idea of an embodiment of the present invention. Those skilled in the art will appreciate that the processes illustrated in FIGS. 4 to 6 may be variously changed or modified by changing the order of steps shown in FIGS. 4 to 6 or by performing one or more steps in parallel without departing from the features of an embodiment of the present invention. Therefore, the processes illustrated in FIGS. 4 to 6 are not limited to the temporal order shown.

Meanwhile, the steps in the flowcharts illustrated in FIGS. 4 to 6 can be embodied as computer-readable code on a computer-readable recording medium. The computer-readable recording medium includes all kinds of data storage devices that can store data that can be read by a computer system. Examples of the computer-readable recording medium include magnetic storage media (e.g., ROM, a floppy disk, a hard disk and the like) and optical recording media (e.g., a CD-ROM, a DVD, and the like). The computer-readable recording medium can also be distributed over computer systems connected through a network so that the computer-readable code is stored and executed in a distributed manner.

Figure 8:
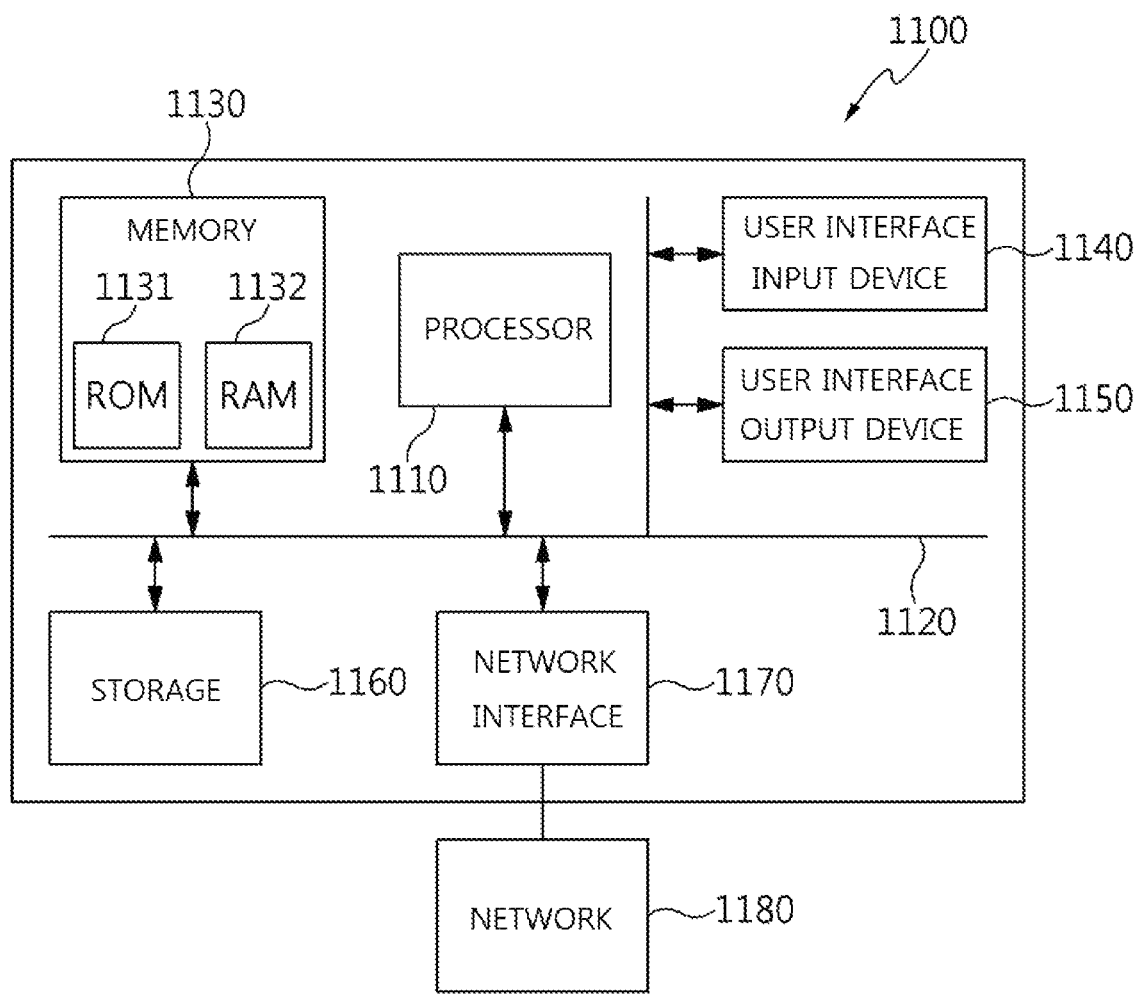
FIG. 8 is a view that shows a computer system according to an embodiment of the present invention.

FIG. 8 is a view that shows a computer system according to an embodiment of the present invention Referring to FIG. 8, the terminal 710 and the server 720 according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

As described above, according to the embodiments of the present invention, a navigation device, which is capable of autonomously calculating a route, may be provided with information about the conditions of roads in an emergency area in the event of an emergency situation, such as a disaster or the like, and may calculate a route using the provided information in a navigation service based on mobile communication.

Also, according to the embodiments of the present invention, the amount of resources used in a service server may be reduced through the creation and use of common resources, information about unusable routes may be quickly collected by receiving new information thereabout from users, and the collected information may be provided to other users.

Also, when new information about unusable routes is acquired, the information is immediately provided to users who subscribe to a notification service, whereby the number of times a server is accessed may be reduced. As a result, overload due to excessive access to the server may be prevented, and the server may be stably managed.

The above description is merely intended to illustratively describe the technical spirit of the present invention, and various changes and modifications can be made by those skilled in the art to which the present invention pertains without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims, and all technical spirits falling within the equivalent scope thereof should be interpreted as being included in the scope of the present invention.

What is claimed is:

1. A method in which a server provides route information related to an emergency area to a terminal that is capable of calculating a route, comprising:
   constructing an emergency area resource that includes unusable route information related to an emergency area; and
   receiving trip parameters from multiple applications and transmitting a link, through which the emergency area resource is accessible, to an application, the trip parameter of which includes a request to provide unusable route information related to an emergency area, wherein transmitting the link is configured to transmit a link, through which a same emergency area resource is accessible, to applications that request provision of unusable route information related to a same emergency area
   wherein a user of the terminal is able to provide unusable route information to the emergency area resource for use by other terminals,
   wherein the constructing of the emergency area resource includes:
      constructing the emergency area resource so as to include information about a route expected to be unusable in a future; and
      transmitting a notification message including an identifier of the information about the route expected to be unusable, when the route expected to be unusable becomes unusable, the identifier of the information about the route expected to be unusable used for updating the unusable route information by the terminal which receives the notification message.

2. The method of claim 1, further comprising:
   receiving a request to subscribe to a notification service related to the emergency area from an application; and
   when the unusable route information is updated, notifying the application, which requests subscription to the notification service, of updated unusable route information.

3. The method of claim 2, wherein notifying the application of the updated unusable route information is configured to notify the application of the updated unusable route information when a current position of the application is received from the application is in the vicinity of the emergency area.

4. The method of claim 2, further comprising: when all of routes in the emergency area are restored to usable routes, transmitting a notification message for announcing that all of the routes become usable routes to the application that subscribes to the notification service.

5. The method of claim 4, wherein transmitting the notification message is configured such that the server transmits the notification message and deletes a resource related to the unusable route information and such that the application discards the unusable route information by receiving the notification message for announcing that all of the routes are restored.

6. The method of claim 2, wherein the request to subscribe to the notification service includes a subscription resource that the application creates by setting a notification condition for the notification service.

7. The method of claim 6, wherein receiving the request to subscribe to the notification service is configured to receive the request including the subscription resource in which the notification condition is set such that the application receives updated information about unusable routes only when a current position thereof corresponds to the updated information.

8. The method of claim 1, further comprising: transmitting a location of an emergency area related to the trip parameter to the application when the trip parameter does not include the request to provide unusable route information related to an emergency area.

9. A server apparatus for providing route information related to an emergency area to a terminal that is capable of calculating a route, comprising:
a communication unit for communicating with the terminal; and
a control unit for providing traffic information for a route that is received from the terminal,
wherein the control unit is configured to:
construct an emergency area resource that includes unusable route information related to an emergency area;
receive trip parameters from multiple applications and transmit a link, through which the emergency area resource is accessible, to an application, the trip parameter of which includes a request to provide unusable route information related to an emergency area; and
transmit a link, through which a same emergency area resource is accessible, to applications that request provision of unusable route information related to a same emergency area, and
wherein a user of the terminal is able to provide unusable route information to the emergency area resource for use by other terminals,
wherein the emergency area resource includes information about a route expected to be unusable in a future,
wherein the control unit transmits a notification message including an identifier of the information about the route expected to be unusable, when the route expected to be unusable becomes unusable, the identifier of the information about the route expected to be unusable used for updating the unusable route information by the terminal which receives the notification message.

10. The server apparatus of claim 9, wherein the control unit receives a request to subscribe to a notification service related to the emergency area from an application and notifies the application, which requests subscription to the notification service, of updated unusable route information when the unusable route information is updated.

11. The server apparatus of claim 10, wherein the control unit notifies the application of the updated unusable route information when a current position of the application is received from the application that approaches is in the vicinity of the emergency area.

12. The server apparatus of claim 10, wherein, when all of routes in the emergency area are restored to usable routes, the control unit transmits a notification message for announcing that all of the routes become usable routes to the application that subscribes to the notification service.

13. The server apparatus of claim 12, wherein:
the control unit transmits the notification message and deletes a resource related to the unusable route information; and
the application discards the unusable route information by receiving the notification message for announcing that all of the routes are restored.

14. The server apparatus of claim 10, wherein the request to subscribe to the notification service includes a subscription resource that the application creates by setting a notification condition for the notification service.

15. The server apparatus of claim 14, wherein the control unit receives the request to subscribe to the notification service, the request including the subscription resource in which the notification condition is set such that the application receives updated information about unusable routes only when a current position thereof corresponds to the updated information.

16. The server apparatus of claim 9, wherein the control unit transmits a location of an emergency area related to the trip parameter to the application when the trip parameter does not include the request to provide unusable route information related to an emergency area.

* * * * *